Patented Feb. 7, 1939

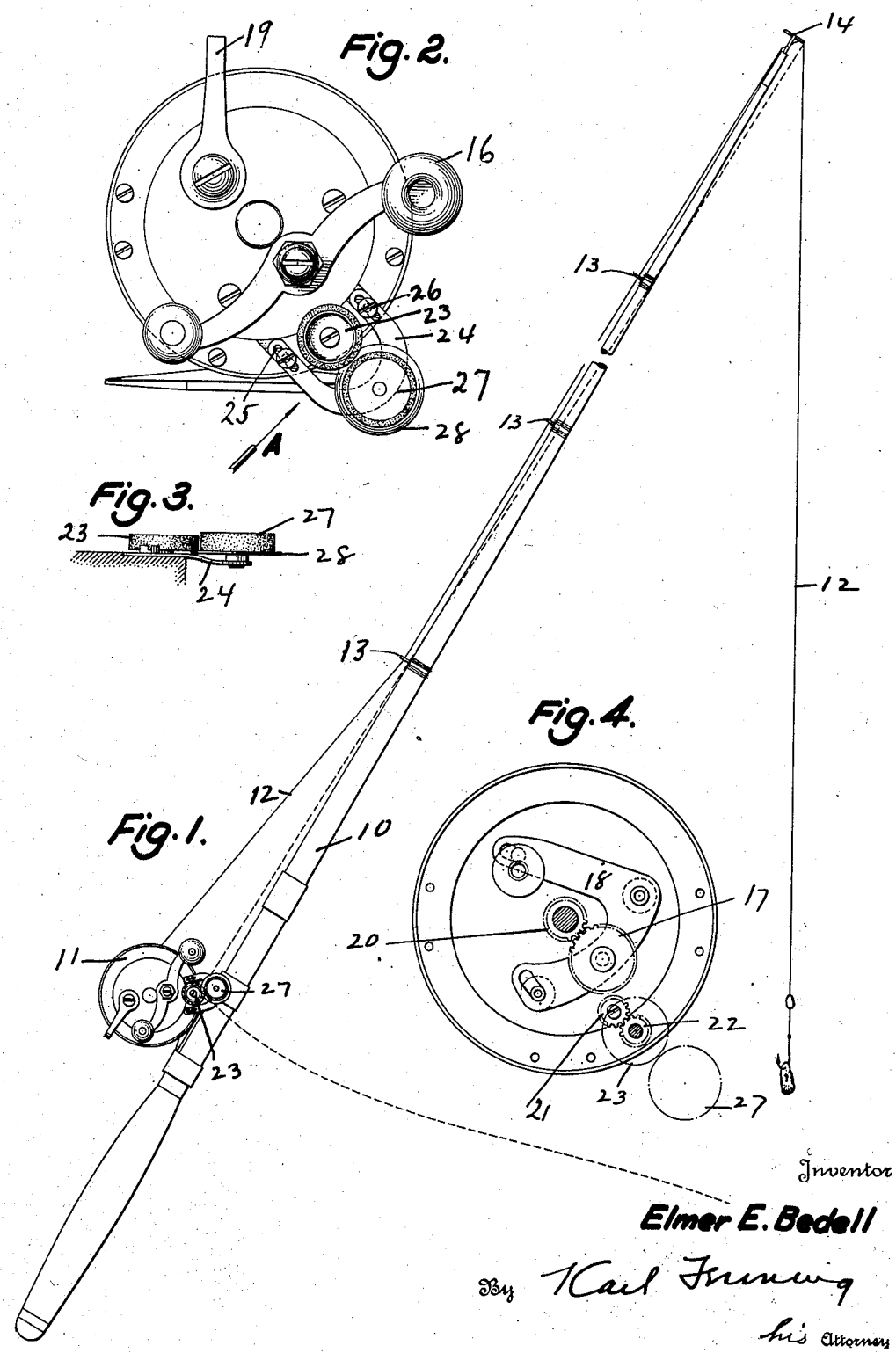

2,145,966

UNITED STATES PATENT OFFICE 2,145,966

FISHING REEL

Elmer E. Bedell, Southampton, N. Y.

Application August 8, 1938, Serial No. 223,751

6 Claims. (Cl. 242—84.1)

The ordinary fishing reel is adapted to reel up or in a fishing line and to allow the line to be pulled out. Ordinarily no provision is made for positively feeding the line out. It is a purpose of the present invention to provide mechanism for feeding out the line. Such mechanism is particularly desirable when there is no weight or sinker on the line. It is usual to pay out a lot of line so that the hook and bait may be properly positioned in the water and at a proper distance from the fisherman. In such instances it has been customary in the past to throw the unweighted bait and hook into the water and then by hand pull the line from the reel and allow the current or water movement to pull the line out. This is an awkward and inconvenient procedure. Sometimes the water drag is not sufficient to pull the line out satisfactorily. Sometimes the line catches and bunches at the various stays along the fishing rod through which the line passes. The present invention overcomes these various objectionable features and consists of a mechanism in the reel which may positively feed the line forward. It is so arranged that it may be used to draw line along and through the end of the rod and thus overcome the tendency to drag or catch in the stays along the rod itself.

The invention contemplates a mechanism to this end which may be built into a fishing reel or which may be added to or applied to fishing reels already on the market. Reels now on the market include a hand mechanism for driving a gear which drives the spool of the reel in a direction to wind in the fishing line. Means generally are provided for throwing the gears out of engagement so as to allow the spool to run freely. One embodiment of the present invention contemplates employing such a hand operating mechanism which, when thrown out of engagement with the reel spool, may operate a roller which may cooperate with an idler roller to grasp and feed out the fishing line.

In the accompanying drawing, Figure 1 is a side elevation of a fishing rod, line and reel embodying the present invention. Fig. 2 is an enlarged side elevation of the reel. Fig. 3 is a fragmentary plan view in the direction indicated by the arrow A in Fig. 2. Fig. 4 is a more or less diagrammatic skeleton view showing the operating mechanism.

On the fishing rod 10 may be mounted the reel designated generally by 11. From the reel extends the fishing line 12 through stays or guides 13 on the rod and through the tip eye 14 at the end of the rod. A hook is illustrated carrying the bait. The reel is provided with the usual operating handle 16 which operates a gear 17 carried by an angle lever 18 which is operated by a gear shift lever 19. In one position of the gear shift lever 19 the gear 17 may be in engagement with the gear 20 for operating the spool mechanism in a direction to retract or draw in the fishing line. When the gear shift lever 19 is moved the gear 17 is thrown out of engagement with the gear 20 and the spool is free to turn. The mechanism so far described is shown diagrammatically since it is old and well known in the art.

In the reel casing may be mounted a gear 21 and another gear 22 in constant mesh and carried by the reel frame. Gear 21 may be positioned to be engaged by gear 17 when the gear 17 is thrown to the end of its movement. Mounted on the shaft of the gear 22 is a roller 23. The gears 21 and 22 may be enclosed within the casing of the reel while the roller 23 will preferably be exposed or it may be partially or wholly within the casing of the reel frame. Carried by the reel frame is a projecting supporting member 24. This is illustrated as arch shaped and its legs are provided with slots 25 through which pass screws 26. The supporting member 24 is preferably made of resilient or spring material. Carried by the supporting member 24 is a freely rotating roller 27. Adjustments of the slots 25 by the screws 26 may cause the periphery of the roller 27 to come into contact with or more or less closely approach the periphery of the roller 23. At least one of the rollers 23 and 27 may be provided with resilient or rubber surfaces for the purpose of procuring good contact with the fishing line when it passes between the rollers. The roller 27 is preferably provided with a projecting lip or rim 28 which is adapted to hold the rollers in proper register and prevent the line from passing through between the rollers and the supporting member 24 and becoming entangled and out of position to be operated or moved by the roller 23. The resiliency of the support 24 may tend to hold the rim 28 against the roller 23 and because of its bent shape the support tends to resiliently press the surface of the roller 27 toward the surface of the roller 23. The slots 25 and the screws 26 provide convenient means for adjusting the space between the rollers 23 and 27 to receive and operate on fishing lines of different weights or thicknesses. The resilient surfaces of the rollers 23 and 27 which may be provided on one or both the rollers provides good contact with the fishing line and allows for some variation in the size of the line to be operated on without adjustment of the slots 25 by the screws 26.

For operation it may be convenient to grasp the line anywhere between the hook and tip eye 14 and place it between the rollers 23 and 27. It may be conveniently held here with the hook in desirable position for properly affixing the bait to the hook.

It will be seen that the line can easily be inserted between the rollers 23 and 27 by moving it into the space from the top as shown in Fig. 3, the space between the rollers being unobstructed and open at this end although it may be closed against the entrance of the line at the other end by the rim 28 or by the bracket 24. The line can be likewise removed easily in the reverse direction.

After the bait has been affixed to the hook the gear shift lever 19 may be in position to disengage the gear 17 from the gear 20 and engage the gear 17 with the gear 21. Operation, now of the handle 16 will cause the roller 23 to operate in a direction opposite to the retracting operation of the reel. The line being held between the rollers 23 and 27 will thus be drawn upward through the guides 13 and 14 and forced outward into the water. When sufficient of the fishing line has been positively fed outward in this manner operation of the handle 16 may be discontinued and the line released from the rollers 23 and 27 and fishing may be proceeded with in the usual manner, the hook and line being subject to the control of the reel in the usual manner for retraction or drawing in when the gear shift lever 19 is returned to position to engage the gear 17 with the gear 20.

The roller 27 has been illustrated as larger in diameter than the roller 23. This may be desirable but is not essential. The relative sizes of the rollers 23 and 27 may be varied. Other changes in construction and operation may be made and the invention may be embodied in other forms of apparatus.

I claim as my invention:

1. In combination with a fishing reel having a gear for turning the reel and means for moving the gear into and out of reel operating position, a roll, means to operate the roll driven by the gear when the gear is out of reel operating position, a second roll, and resilient means for urging the second roll toward the driven roll, the space between the rolls being unobstructed and open at one end for the passage of fishing line.

2. In combination with a fishing reel having a gear for turning the reel and means for moving the gear into and out of reel operating position, a roll, means to operate the roll driven by the gear when the gear is out of reel operating position, a second roll, a projecting rim on the second roll, and resilient means for urging the second roll toward the driven roll, the space between the rolls being unobstructed and open at one end for the passage of fishing line.

3. In combination with a fishing reel having a gear for turning the reel and means for moving the gear into and out of reel operating position, a roll, means to operate the roll driven by the gear when the gear is out of reel operating position, a second roll, resilient means for urging the second roll toward the driven roll, the space between the rolls being unobstructed and open at one end for the passage of fishing line, and means for adjusting the relative relations of the rolls.

4. In combination with a fishing reel having a gear for turning the reel in a direction to draw in the fishing line and means for moving the gear into and out of reel operating position, means operated by the gear when out of reel operating position to draw line from the reel.

5. In combination with a fishing reel having a gear for turning the reel in a direction to draw in the fishing line and means for moving the gear into and out of reel operating position, cooperating rolls operated by the gear when out of reel operating position to draw line from the reel.

6. In combination with a fishing reel having means for turning the reel in a direction to draw in the fishing line, rolls to draw line from the reel, and means for preventing the first named means from turning the reel and for causing it to operate the rolls.

ELMER E. BEDELL.